United States Patent
Jung et al.

(10) Patent No.: US 12,081,627 B2
(45) Date of Patent: Sep. 3, 2024

(54) PROFILING BASED ON PERSONAL REGION OF INTEREST

(71) Applicant: LG ELECTRONICS INC., Seoul (KR)

(72) Inventors: Boosoon Jung, Seoul (KR); Sangyeob Yoon, Seoul (KR); Mingyoung Kam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 740 days.

(21) Appl. No.: 17/103,049

(22) Filed: Nov. 24, 2020

(65) Prior Publication Data

US 2021/0224542 A1 Jul. 22, 2021

(30) Foreign Application Priority Data

Jan. 17, 2020 (KR) .................. 10-2020-0006795

(51) Int. Cl.
| | |
|---|---|
| *G06K 9/00* | (2022.01) |
| *G06F 16/9535* | (2019.01) |
| *G06F 16/9537* | (2019.01) |
| *G06K 9/32* | (2006.01) |
| *G06N 3/04* | (2023.01) |
| *G06V 10/20* | (2022.01) |
| *G06V 20/30* | (2022.01) |
| *H04L 67/306* | (2022.01) |
| *G06V 40/16* | (2022.01) |
| *H04L 67/1095* | (2022.01) |

(52) U.S. Cl.
CPC ........ *H04L 67/306* (2013.01); *G06F 16/9535* (2019.01); *G06F 16/9537* (2019.01); *G06N 3/04* (2013.01); *G06V 10/255* (2022.01); *G06V 20/30* (2022.01); *G06V 40/161* (2022.01); *H04L 67/1095* (2013.01)

(58) Field of Classification Search
CPC . G06F 16/9535; G06F 16/9537; G06V 20/30; G06V 10/255; G06V 40/161; G06N 3/04; H04L 67/1095; H04L 67/306; H04L 67/01; H04L 67/30; H04L 67/52; H04L 67/535

See application file for complete search history.

(56) References Cited

U.S. PATENT DOCUMENTS

| | | | |
|---|---|---|---|
| 10,507,793 B1 * | 12/2019 | De Moura Partika | ....................... G08B 13/19613 |
| 2009/0005987 A1 * | 1/2009 | Vengroff | ................. H04W 4/02 705/7.34 |

(Continued)

*Primary Examiner* — Edward F Urban
*Assistant Examiner* — Duy Tran
(74) *Attorney, Agent, or Firm* — Birch, Stewart, Kolasch & Birch, LLP

(57) ABSTRACT

Disclosed are a profiling method and apparatus based on a personal region of interest. The profiling method includes determining a region of interest (ROI) indicative of an interest region of a user based on the profile of a person, and generating relationship information indicative of a relationship between a specific person and the user based on a degree of intimacy between persons and the ROI. The AI device and the AI system of the present disclosure may be associated with an artificial intelligence module, a drone (or unmanned aerial vehicle (UAV)), a robot, an augmented reality (AR) device, a virtual reality (VR) device, a device related to 5G service, etc.

14 Claims, 20 Drawing Sheets

(56) References Cited

U.S. PATENT DOCUMENTS

| | | | | |
|---|---|---|---|---|
| 2012/0002868 A1* | 1/2012 | Loui | ................ | G06V 20/30 |
| | | | | 382/199 |
| 2012/0314912 A1* | 12/2012 | Nakagomi | ............ | G06Q 50/01 |
| | | | | 382/115 |
| 2013/0080534 A1* | 3/2013 | Ogawa | ............ | G06F 16/90335 |
| | | | | 709/204 |
| 2018/0300540 A1* | 10/2018 | Swisher | ................ | G06N 3/045 |
| 2019/0102606 A1* | 4/2019 | Nowozin | ................ | G06N 20/00 |
| 2019/0253966 A1* | 8/2019 | Park | ................ | H04W 52/0229 |

* cited by examiner

FIG. 12

| Event data Type | Category | Labeling data |
|---|---|---|
| SMS/MMS | Message ROI | oo sushi restaurant |
| Image/Video | Photo ROI | Sea/sky |
| App Usage | App ROI | Instagram / SNS |
| Calendar/Task | Schedule ROI | Friend meeting |
| Call Log | Call ROI | Mother |
| Qmemo | Memo ROI | Chocolate recipe |
|  | Life ROI | Home/company |
|  | Specific ROI |  |

PROFILING BASED ON PERSONAL REGION OF INTEREST

This application is based on and claims priority under 35 U.S.C. 119 to Korean Patent Application No. 10-2020-0006795 filed on Jan. 17, 2020, which is incorporated herein by reference for all purposes as if fully set forth herein

BACKGROUND OF THE INVENTION

Field of the Invention

The present disclosure relates to a profiling method and apparatus based on a personal region of interest.

Related Art

Artificial intelligence technology consists of element technologies that utilize deep learning and machine learning.

Machine learning is an algorithm technology that classifies/learns the characteristics of input data on its own, and element technology is a technique that simulates functions such as recognition and judgment of human brain by utilizing machine learning algorithms such as deep learning, and consists of technical fields such as verbal understanding, visual understanding, reasoning/predicting, knowledge expression, and motion control.

Still images or moving images obtained at various times or places may be classified or grouped based on a given criterion. In this case, an electronic device may classify or group the still images or the moving images in response to a manual input from a user. It is necessary to use an artificial intelligence technology in order to improve such inconvenience in using the electronic device.

SUMMARY OF THE INVENTION

The present disclosure is directed to solving the aforementioned need and/or problem.

Furthermore, the present disclosure is directed to implementing a profiling method and apparatus based on a personal region of interest (ROI), which can generate information on a plurality of persons based on a degree of intimacy between the persons.

Furthermore, the present disclosure is directed to implementing a profiling method and apparatus based on a personal ROI, which can generate relationship information between persons by considering an ROI.

In an aspect, a profiling method includes obtaining source data for generating a profile, performing clustering based on the source data and map information related to the source data, generating a profile of a person using a cluster generated through the clustering, determining a region of interest (ROI) indicative of an interest region of a user based on the profile of the person and collecting a plurality of images obtained from the ROI, and determining a degree of intimacy between the user and a specific person included in the plurality of images by analyzing the plurality of images and generating relationship information indicative of a relationship between the specific person and the user based on the degree of intimacy and the ROI.

Furthermore, the source data may include location information, message information, an image/video or calendar information of the user, information on a task input by the user, or a call log, memo or application usage of the user.

Furthermore, the source data may be received from an external terminal.

Furthermore, the plurality of images may include an image including both the user and the specific person.

Furthermore, the degree of intimacy may be determined by a pre-trained first neural network model. The first model may be a neural network model pre-trained by setting, as an input, at least one of (i) a distance between the specific person and the user and (ii) the number of images in which the specific person and the user simultaneously appear and setting the degree of intimacy as an output.

Furthermore, the degree of intimacy may be increased as the distance between the specific person and the user is closer.

Furthermore, the degree of intimacy may be increased as the number of images in which the specific person and the user simultaneously appear is increased.

Furthermore, the profiling method may further include detecting faces of the specific person and the user in the plurality of images. The distance may be a distance between a first face of the specific person and a second face of the user.

Furthermore, the profiling method may further include receiving, from a network, DCI used to schedule a transmission of the source data and transmitting the source data to the network based on the DCI.

Furthermore, the profiling method may further include performing an initial access procedure with the network based on an SSB, and transmitting the source data to the network through a PUSCH. The DM-RSs of the SSB and the PUSCH are QCLed with respect to a QCL type D.

Furthermore, the profiling method may further include controlling a transceiver to transmit the source data to an AI processor included in the network and controlling the transceiver to receive AI-processed information from the AI processor. The AI-processed information may include the degree of intimacy and relationship information indicative of a relationship between the specific person and the user based on the ROI.

In an aspect, a profiling method includes collecting location-based content, generating information on a degree of intimacy between a plurality of persons based on at least one of a distance between the plurality of persons included in the location-based content or the number of times that the person simultaneously appears, and generating information on a character relationship between the plurality of persons based on the degree of intimacy and location information of the content.

BRIEF DESCRIPTION OF THE DRAWINGS

The attached drawings, which are included as part of a detailed description to help you understand this statement, provide an example of implementation for this statement and explain the technical features of this statement with a detailed description.

FIG. 12 is a flowchart of a method of generating the ROI data of a user, which may be applied to various embodiments of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
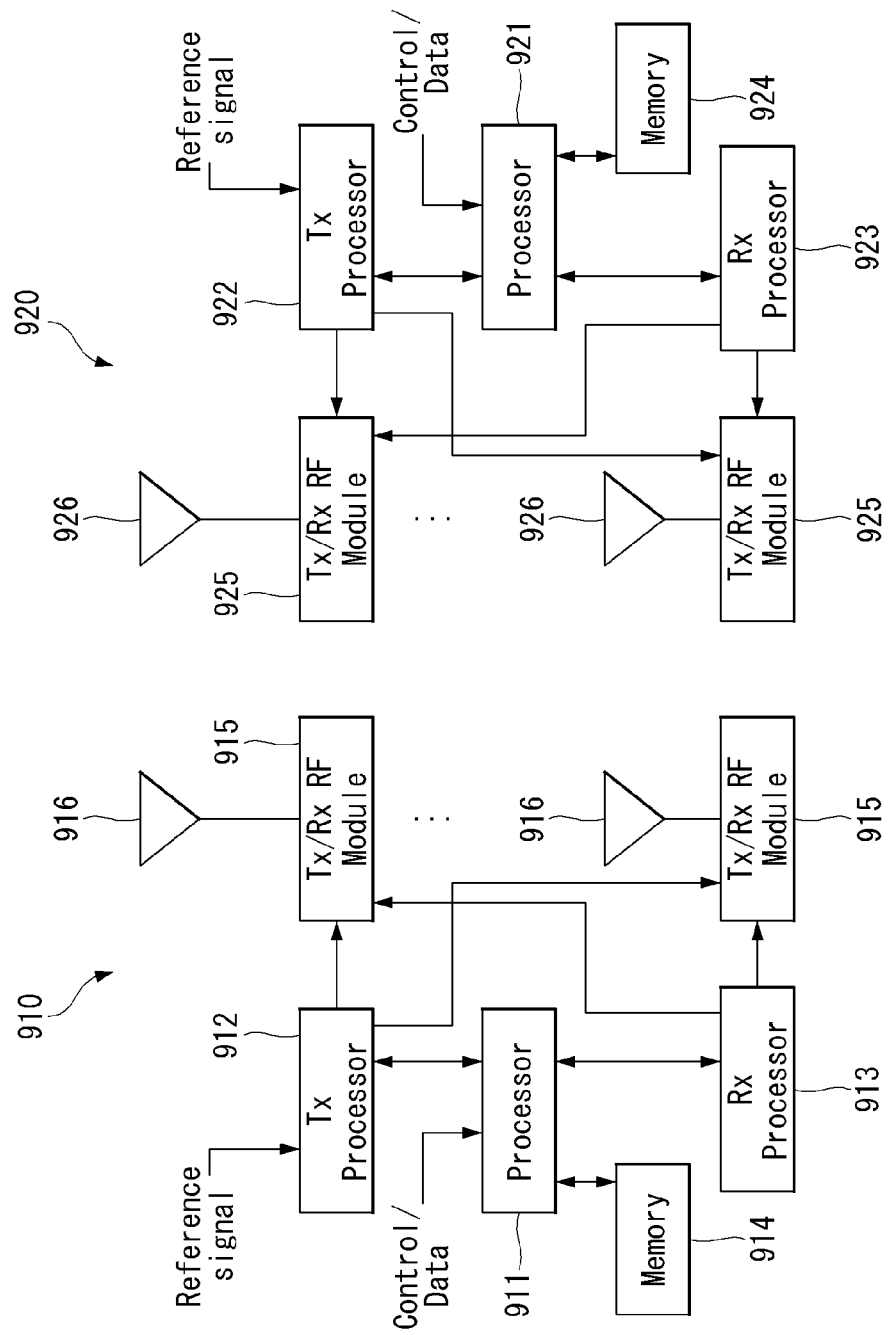
FIG. 1 shows an example of a block diagram of a wireless communication system to which methods proposed in the present specification is applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, vehicles, vehicles equipped with self-driving features, connected cars, drones, AI (Unmanned Aerial Vehicle, UAV), robots, Aged Reality (AR) devices, VR (Virtual Reality) devices, MED REALity devices, public safety devices, public TCs, MTC devices, IoT devices, medical devices, FinTech devices (or financial devices), security devices, climate/environmental devices, 5G services, or other devices related to the fourth industrial revolution, or like.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication

Figure 2:
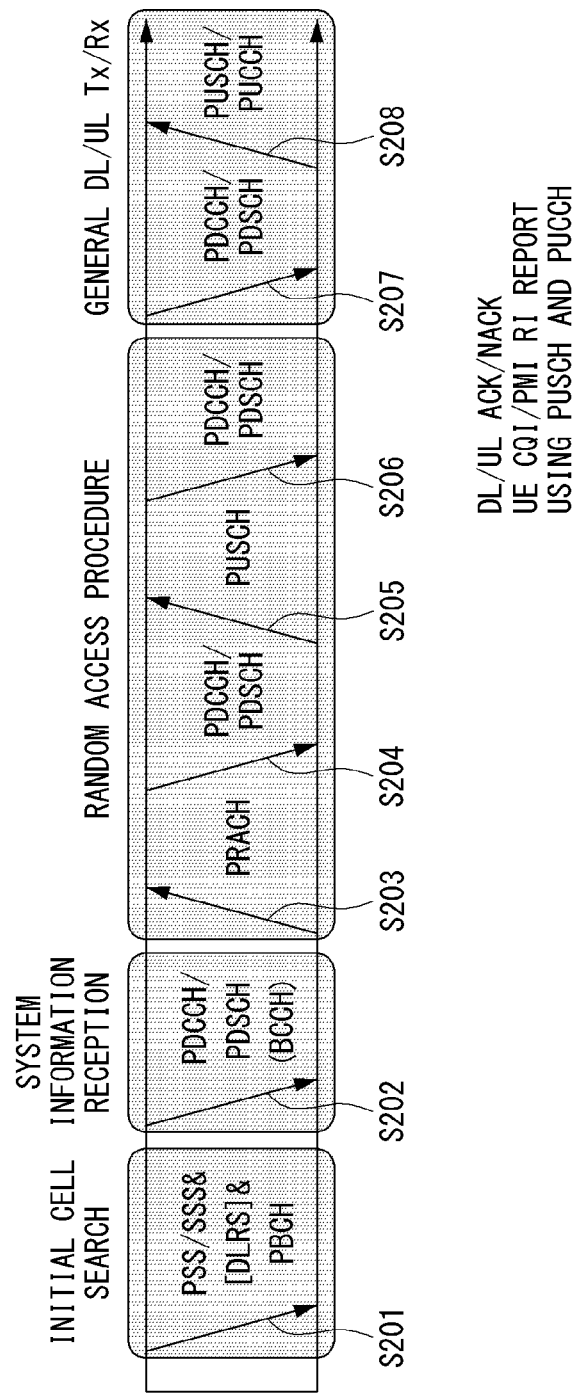
FIG. 2 is a diagram showing an example of a signal transmitting/receiving method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, ... }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
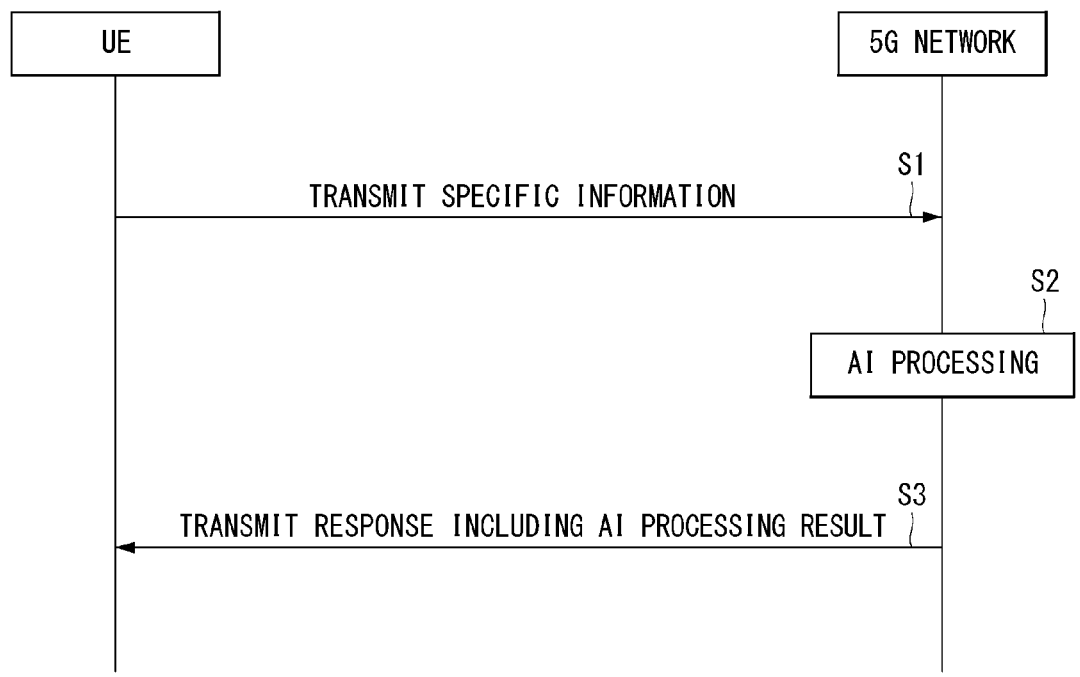
FIG. 3 shows an example of a user terminal and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
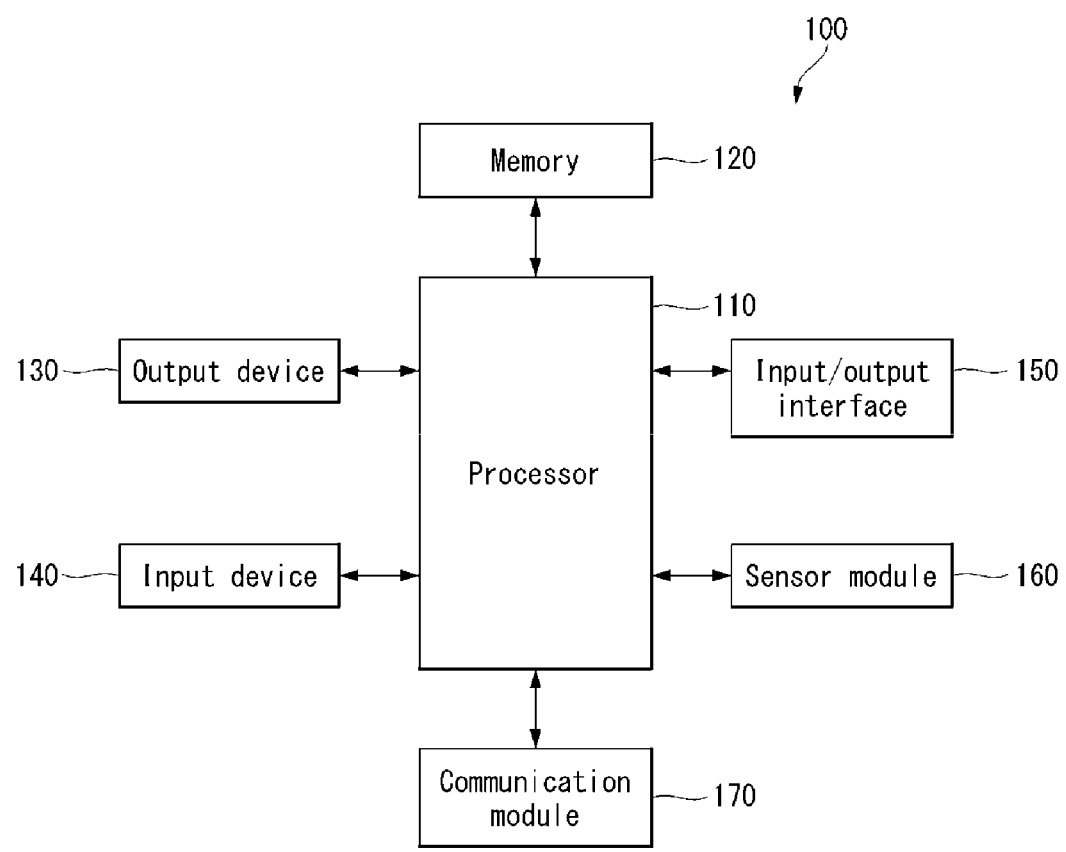
FIG. 4 illustrates a block diagram of an electronic device.

FIG. 4 illustrates a block diagram of an electronic device.

Referring to FIG. 4, an electronic device 100 may include at least one processor 110, a memory 120, an output device 130, an input device 140, an input/output interface 150, a sensor module 160, and a communication module 170.

The processor 110 may include at least one application processor (AP), at least one communication processor (CP), or at least one artificial intelligence (AI) processor. The application processor, the communication processor, or the AI processor may be respectively included in different integrated circuit (IC) packages, or may be included in one IC package.

The application processor may control a plurality of hardware or software components connected to the application processor by running an operating system or an application program, and perform various data processing/operation including multimedia data. For example, the application processor may be implemented as a system on chip (SoC). The processor 110 may further include a graphic processing unit (GPU) (not shown).

The communication processor may perform functions of managing a data link and converting a communication protocol in communication between the electronic device 100 and other electronic devices connected via a network. For example, the communication processor may be implemented as the SoC. The communication processor may perform at least a portion of a multimedia control function.

In addition, the communication processor may control data transmission and reception of the communication module 170. The communication processor may be implemented to be included as at least a part of the application processor.

The application processor or the communication processor may load, on a volatile memory, and process a command or data that is received from at least one of a non-volatile memory or other components connected to each of the application processor and the communication processor. Further, the application processor or the communication processor may store data, that is received from at least one of other components or generated by at least one of the other components, in the non-volatile memory.

The memory 120 may include an internal memory or an external memory. The internal memory may include at least one of a volatile memory (e.g., dynamic RAM (DRAM), static RAM (SRAM), synchronous dynamic RAM (SDRAM), etc.) or a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). According to an embodiment, the internal memory may take the form of a solid state drive (SSD). The external memory may include flash drive, for example, compact flash (CF), secure digital (SD), micro secure digital (Micro-SD), mini secure digital (Mini-SD), extreme digital (xD) or a memory stick, etc.

The output device 130 may include at least one of a display module or a speaker. The output device 130 may display various types of data including multimedia data, text data, voice data, etc. to a user or output the data as sound.

The input device 140 may include a touch panel, a digital pen sensor, a key, or an ultrasonic input device, etc. For example, the input device 140 may be the input/output interface 150. The touch panel may recognize a touch input in at least one of capacitive, pressure-sensitive, infrared, or ultrasonic types. In addition, the touch panel may further include a controller (not shown). In case of a capacitive touch panel, not only direct touch but also proximity recognition is possible. The touch panel may further include a tactile layer. In this case, the touch panel may provide a tactile reaction to the user.

The digital pen sensor may be implemented using the same or similar method to receiving a user's touch input or a separate recognition layer. The key may use a keypad or a touch key. The ultrasonic input device is a device that can confirm data by detecting a micro-sonic wave at a user equipment (UE) through a pen generating an ultrasonic signal, and is capable of wireless recognition. The electronic device 100 may also receive a user input from an external device (e.g., network, computer, or server) connected to the communication module 170 using the communication module 170.

The input device 140 may further include a camera module and a microphone. The camera module is a device capable of taking images and videos, and may include one or more image sensors, an image signal processor (ISP), or a flash LED. The microphone may receive a voice signal and convert it into an electrical signal.

The input/output interface 150 may transmit a command or data, that is input from the user through the input device or the output device, to the processor 110, the memory 120, the communication module 170, etc. through a bus (not shown). For example, the input/output interface 150 may provide the processor 110 with data for a user's touch input that is input through the touch panel. For example, the input/output interface 150 may output a command or data, that is received from the processor 110, the memory 120, the communication module 170, etc. through the bus, through the output device 130. For example, the input/output interface 150 may output voice data processed by the processor 110 to the user through the speaker.

The sensor module 160 may include at least one of a gesture sensor, a gyro sensor, an atmospheric pressure sensor, a magnetic sensor, an acceleration sensor, a grip sensor, a proximity sensor, an RGB (red, green, blue) sensor, a biometric sensor, a temperature/humidity sensor, an illuminance sensor, or an ultraviolet (UV) sensor. The sensor module 160 may measure physical quantity or sense an operating state of the electronic device 100 to convert measured or sensed information into electrical signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, a fingerprint sensor, or the like. The sensor module 160 may further include a control circuit for controlling at least one sensor included therein.

The communication module 170 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or a modem, etc. for connecting the electronic device 100 to a network (e.g., Internet, LAN, WAN, telecommunication network, cellular network, satellite network, POTS or 5G network, etc.).

The RF module may be responsible for transmitting and receiving data, for example, transmitting and receiving an RF signal or a called electronic signal. For example, the RF module may include a transceiver, a power amp module (PAM), a frequency filter, or a low noise amplifier (LNA), etc. Further, the RF module may further include components, for example, conductors or lead wires, etc. for transmitting and receiving electromagnetic waves in a free space in wireless communication.

The electronic device 100 according to various embodiments of the present disclosure may include at least one of a server, a TV, a refrigerator, an oven, a clothing styler, a robot cleaner, a drone, an air conditioner, an air cleaner, a PC, a speaker, a home CCTV, an electric light, a washing machine, and a smart plug. Since the components of the electronic device 100 illustrated in FIG. 4 are exemplified as components generally provided in an electronic device, the electronic device 100 according to the embodiment of the present disclosure is not limited to the above-described components, and the components may be omitted and/or added, if necessary or desired.

Figure 5:
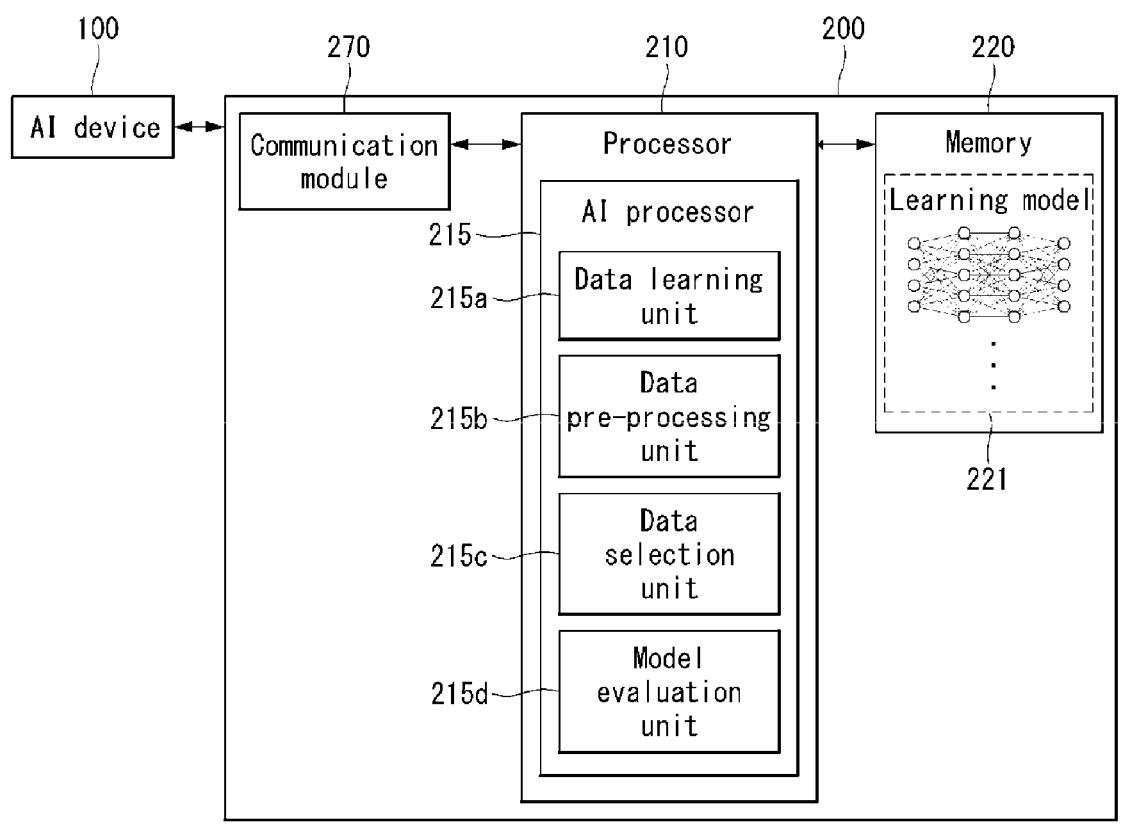
FIG. 5 illustrates a schematic block diagram of an AI server according to an embodiment of the present disclosure.

The electronic device 100 may perform an artificial intelligence-based control operation by receiving a result of AI processing from a cloud environment illustrated in FIG. 5, or may perform AI processing in an on-device manner by including an AI module in which components related to an AI process are integrated into one module.

An AI process performed in a device environment and/or a cloud environment or a server environment is described below with reference to FIGS. 5 and 6. FIG. 5 illustrates an example in which receiving data or signals may be performed in the electronic device 100, but AI processing for processing the input data or signals is performed in the cloud environment. In contrast, FIG. 6 illustrates an example of on-device processing in which the overall operation of AI processing for input data or signals is performed in the electronic device 100.

Figure 6:
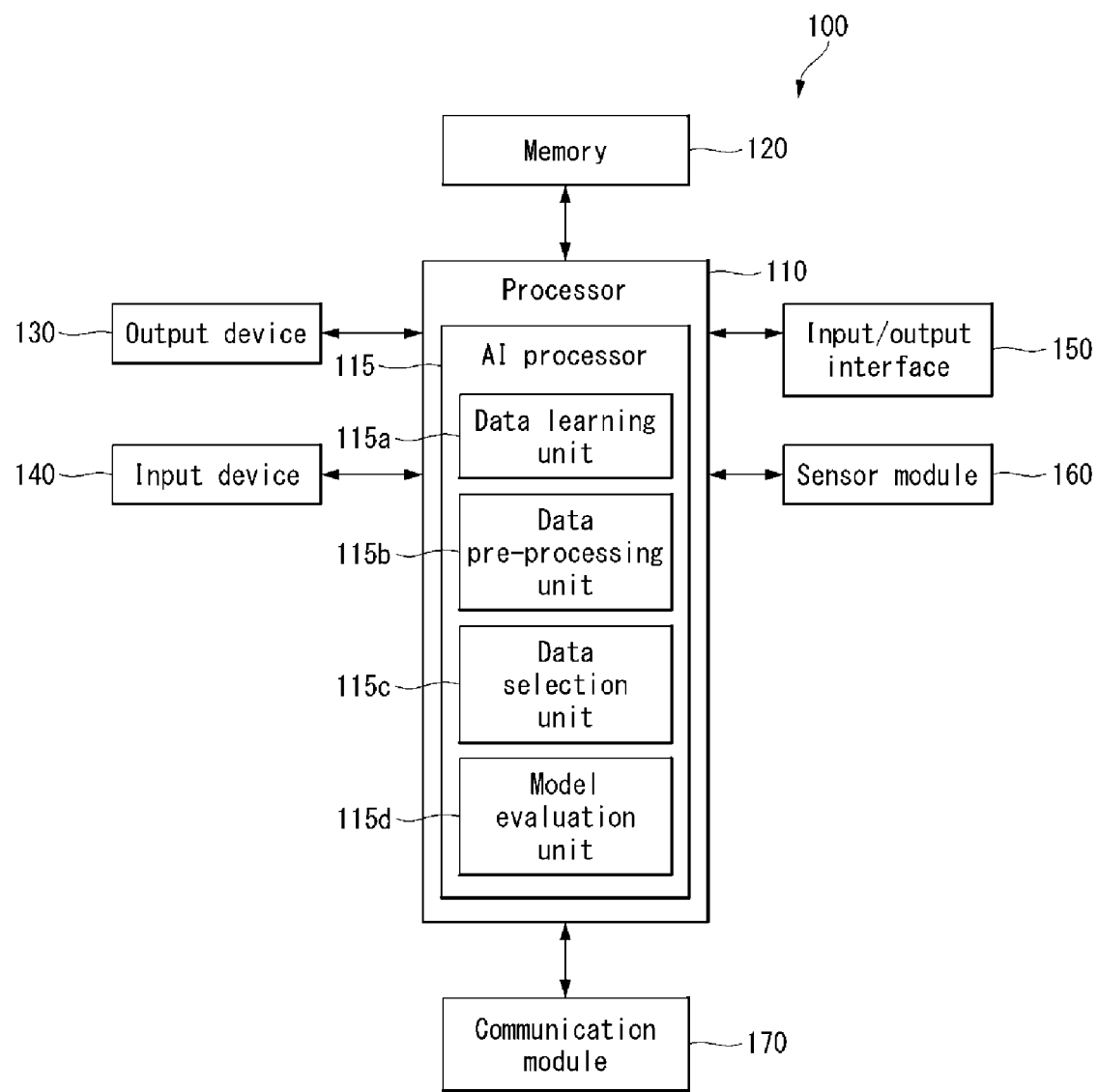
FIG. 6 illustrates a schematic block diagram of an AI device according to another embodiment of the present disclosure.

In FIGS. 5 and 6, the device environment may be referred to as a 'client device' or an 'AI device', and the cloud environment may be referred to as a 'server'.

FIG. 5 illustrates a schematic block diagram of an AI server according to an embodiment of the present disclosure.

A server 200 may include a processor 210, a memory 220, and a communication module 270.

An AI processor 215 may learn a neural network using a program stored in the memory 220. In particular, the AI processor 215 may learn the neural network for recognizing data related to an operation of an AI device 100. Here, the neural network may be designed to simulate the human brain structure (e.g., the neuronal structure of the human neural network) on a computer. The neural network may include an input layer, an output layer, and at least one hidden layer. Each layer may include at least one neuron with a weight, and the neural network may include a synapse connecting neurons and neurons. In the neural network, each neuron may output an input signal input through the synapse as a function value of an activation function for weight and/or bias.

A plurality of network modes may exchange data according to each connection relationship so that neurons simulate synaptic activity of neurons that exchange signals through the synapses. Here, the neural network may include a deep learning model developed from a neural network model. In the deep learning model, a plurality of network nodes are located on different layers and may exchange data according to a convolution connection relationship. Examples of the neural network model may include various deep learning techniques such as a deep neural network (DNN), a convolutional neural network (CNN), a recurrent neural network, a restricted Boltzmann machine, a deep belief network, and a deep Q-Network, and may be applied in fields such as vision recognition, voice recognition, natural language processing, and voice/signal processing.

The processor 210 performing the functions described above may be a general-purpose processor (e.g., a CPU), but may be a dedicated AI processor (e.g., a GPU) for AI learning.

The memory 220 may store various programs and data necessary for the operation of the AI device 100 and/or the server 200. The memory 220 may be accessed by the AI processor 215, and may read/write/modify/delete/update data by the AI processor 215. In addition, the memory 220 may store a neural network model (e.g., the deep learning model) generated through a learning algorithm for data classification/recognition according to an embodiment of the present disclosure. Furthermore, the memory 220 may store not only a learning model 221 but also input data, training data, and learning history, etc.

The AI processor 215 may include a data learning unit 215a for learning a neural network for data classification/recognition. The data learning unit 215a may learn criteria regarding what training data to use to determine data classification/recognition, and how to classify and recognize the data using the training data. The data learning unit 215a may learn the deep learning model by acquiring training data to be used for learning and applying the acquired training data to the deep learning model.

The data learning unit 215a may be manufactured in a form of at least one hardware chip and may be mounted on the server 200. For example, the data learning unit 215a may be manufactured in a form of a dedicated hardware chip for artificial intelligence, or may be manufactured as part of a general-purpose processor (CPU) or a dedicated graphics processor (GPU) and mounted on the server 200. In addition, the data learning unit 215a may be implemented as a software module. When the data learning unit 215a is implemented as the software module (or a program module including instructions), the software module may be stored in a non-transitory computer readable media. In this case, at least one software module may be provided to an operating system (OS), or may be provided by an application.

The data learning unit 215a may learn the neural network model to have criteria for determining how to classify/recognize preset data using the acquired training data. In this instance, a learning method by a model learning unit may be classified into supervised learning, unsupervised learning, and reinforcement learning. Here, the supervised learning may refer to a method of learning an artificial neural network in a state where a label for training data is given, and the label may mean a correct answer (or a result value) that the artificial neural network has to infer when the training data is input to the artificial neural network. The unsupervised learning may mean a method of learning an artificial neural network in a state where the label for training data is not given. The reinforcement learning may mean a method in which an agent defined in a specific environment is learned to select an action or a sequence of actions that maximize cumulative rewards in each state. Further, the model learning unit may learn the neural network model using a learning algorithm including an error backpropagation method or a gradient decent method. When the neural network model is learned, the learned neural network model may be referred to as the learning model 221. The learning model 221 is stored in the memory 220 and may be used to infer a result for new input data rather than the training data.

The AI processor 215 may further include a data pre-processing unit 215b and/or a data selection unit 215c, in order to improve analysis results using the learning model 221 or to save resources or time required to generate the learning model 221.

The data pre-processing unit 215b may pre-process the acquired data so that the acquired data can be used for learning/inference for determining a situation. For example, the data pre-processing unit 215b may extract feature information as pre-processing for input data acquired through the input device, and the feature information may be extracted in a format such as a feature vector, a feature point, or a feature map.

The data selection unit 215c may select data necessary for learning among training data or training data pre-processed by the pre-processing unit. The selected training data may be provided to the model learn unit. For example, the data selection unit 215c may select only data for an object included in a specific region as training data by detecting the specific region among images acquired through a camera of the electronic device. Further, the selection unit 215c may select data necessary for inference among input data acquired through the input device or input data pre-processed by the pre-processing unit.

The AI processor 215 may further include a model evaluation unit 215d to improve the analysis results of the neural network model. The model evaluation unit 215d may input evaluation data into the neural network model and may allow the model learning unit to learn again when an analysis result output from the evaluation data does not satisfy a predetermined criterion. In this case, the evaluation data may be preset data for evaluating the learning model 221. For example, among the analysis results of the learned neural network model for the evaluation data, when the number or ratio of evaluation data whose analysis results are not accurate exceeds a preset threshold, the model evaluation unit 215d may evaluate that a predetermined criterion are not satisfied.

The communication module 270 may send a result of AI processing by the AI processor 215 to an external electronic device.

As described above, FIG. 5 illustrates that the AI process is implemented in the cloud environment due to computing operation, storage, and power constraints, by way of example, but the present disclosure is not limited thereto. For example, the AI processor 215 may be implemented by being included in a client device. FIG. 6 is an example in which AI processing is implemented in the client device, and is substantially the same as that illustrated in FIG. 5 except that the AI processor 215 is included in the client device.

FIG. 6 illustrates a schematic block diagram of an AI device according to another embodiment of the present disclosure.

The function of each configuration illustrated in FIG. 6 may refer to FIG. 5. However, since the AI processor is included in a client device 100, it may not be necessary to communicate with the server 200 (see FIG. 5) in performing a process such as data classification/recognition, etc., and hence an immediate or real-time data classification/recognition operation is possible. Further, since it is not necessary to send personal information of the user to the server 200 (see FIG. 5), it is possible to classify/recognize data for the purpose without leaking the personal information.

The respective components illustrated in FIGS. 5 and 6 indicate functional elements that are divided functionally, and it is noted that at least one component can be implemented in a form (e.g., AI module) integrated with each other in a real physical environment. It goes without saying that components that are not disclosed may be included or omitted, in addition to the plurality of components illustrated in FIGS. 5 and 6.

Figure 7:
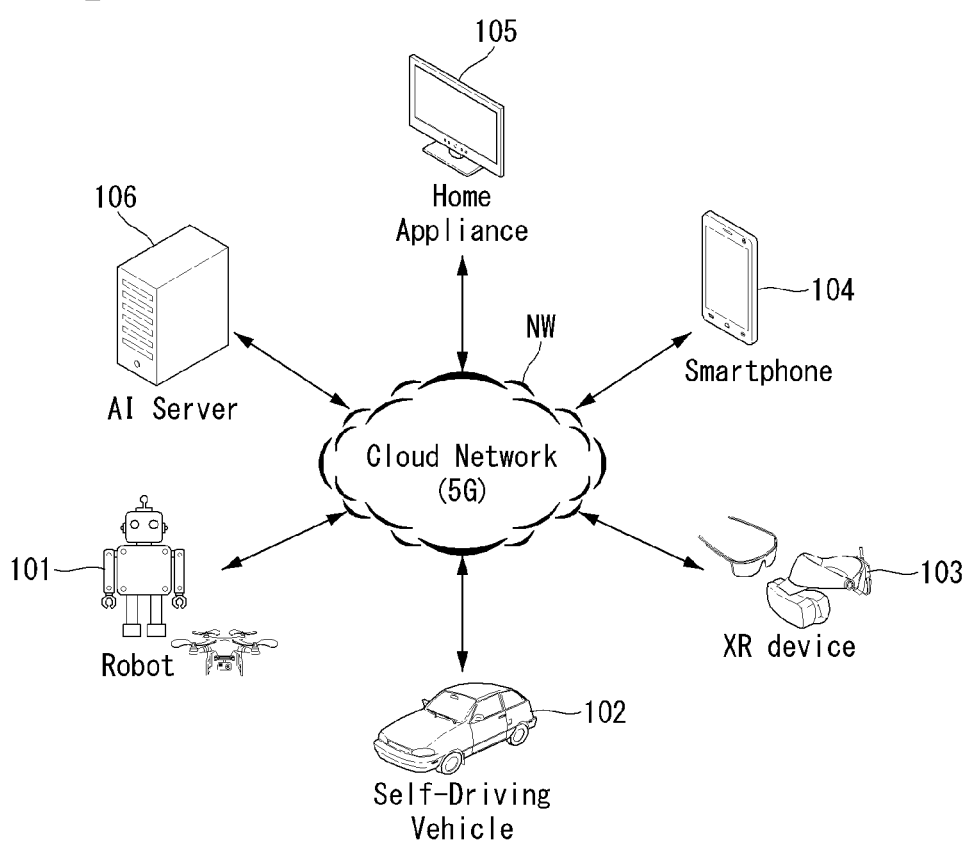
FIG. 7 is a conceptual diagram of an AI device according to an embodiment of the present disclosure.

FIG. 7 is a conceptual diagram of an AI device according to an embodiment of the present disclosure.

Referring to FIG. 7, in an AI system 1, at least one of an AI server 106, a robot 101, an autonomous vehicle 102, an XR device 103, a smartphone 104, or a home appliance 105 is connected to a cloud network NW. The robot 101, the autonomous vehicle 102, the XR device 103, the smartphone 104, or the home appliance 105 applied with the AI technology may be referred to as the AI devices 101 to 105.

The cloud network NW may mean a network that forms a part of a cloud computing infrastructure or exists in the cloud computing infrastructure. The cloud network NW may be configured using the 3G network, the 4G or Long Term Evolution (LTE) network, or the 5G network.

That is, the respective devices 101 to 106 constituting the AI system 1 may be connected to each other via the cloud network NW. In particular, the respective devices 101 to 106 may communicate with each other through a base station, but may directly communicate with each other without going through the base station.

The AI server 106 may include a server performing AI processing and a server performing operations on big data.

The AI server 106 may be connected to at least one of the robot 101, the autonomous vehicle 102, the XR device 103, the smartphone 104, or the home appliance 105, which are AI devices constituting the AI system, via the cloud network NW, and may assist at least a part of the AI processing of the connected AI devices 101 to 105.

In this instance, the AI server 106 may learn the artificial neural network according to a machine learning algorithm instead of the AI devices 101 to 105, and directly store the learning model or send it to the AI devices 101 to 105.

In this instance, the AI server 106 may receive input data from the AI devices 101 to 105, infer a result value for the received input data using the learning model, generate a response or a control command based on the inferred result value, and transmit it to the AI devices 101 to 105.

Alternatively, the AI devices 101 to 105 may infer the result value for the input data directly using the learning model and generate a response or a control command based on the inferred result value.

Intelligence Service Model

Figure 8:
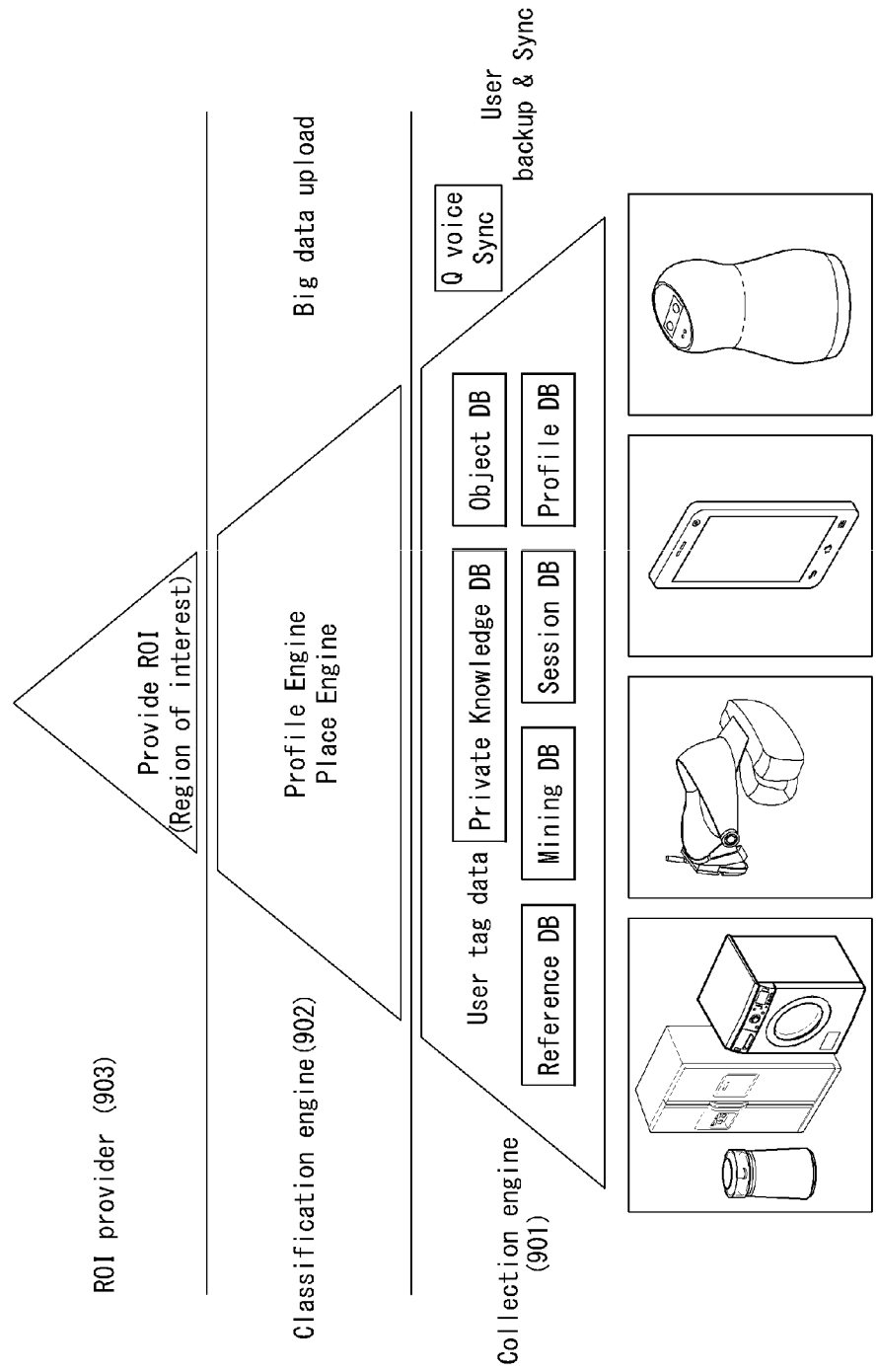
FIG. 8 is an exemplary diagram of an intelligence service model which may be applied to various embodiments of the present disclosure.

FIG. 8 is an exemplary diagram of an intelligence service model which may be applied to various embodiments of the present disclosure.

Referring to FIG. 8, the intelligence service model may include a collection engine 801, a classification engine 802, and an ROI provider 803. The intelligence service model may be installed in an application form and implemented through the processor 110 or may be implemented through a server coupled to the terminal of a user.

The collection engine 801 may collect source data related to user information through a terminal used by a user. Such source data may be databased (DB) and managed for each category in order to generate the ROI of a user. Such DBs may be included in home appliances, a virtual reality machine, a mobile phone, or a robot used by a user, and may be managed in a separate server.

The classification engine 802 may classify source data obtained from the collection engine 801 by clustering the source data. The clustering is to group similar entities, thus being capable of generating clusters for generating the profile of a user. To this end, an AI technology may be used, and the data may become big data and managed. Furthermore, the classification engine 802 may generate the profile of a user which may be used to generate the ROI of the user using the generated clusters, and may generate the ROI of the user using the profile. In the present disclosure, the ROI of a user may include or indicate information on a geographical area which may be determined to be personally interested by the user depending on a profile of the user.

The ROI provider 803 may provide a user with the ROI data of the user generated by the classification engine 802 through a terminal.

In such an intelligence service model, the profile of a user can be analyzed even without a request from a user, and the ROI data of the user can be generated.

Figure 9:
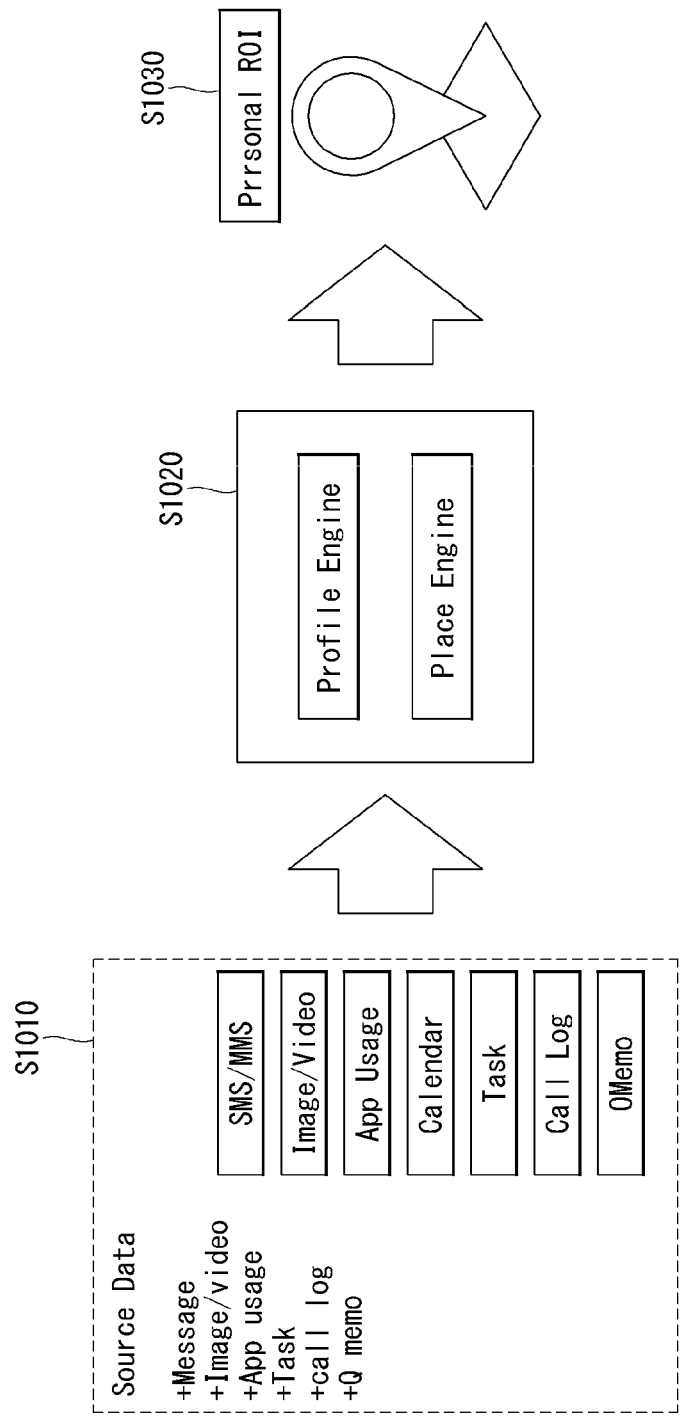
FIG. 9 is an example of the structure of the intelligence service model which may be applied to various embodiments of the present disclosure.

FIG. 9 is an example of the structure of the intelligence service model which may be applied to various embodiments of the present disclosure.

The collection engine 801 may collect source data through the terminal of a user (S1010). The source data may include location information, message information, an image/video, and calendar information of a user, information on a "task" input by the user, and a call log, memo and application usage of the user. As described above, the source data may be managed by each DB.

The classification engine 802 clusters the source data, collected by the collection engine 801, for each defined category. The classification engine 802 may include a profile engine for generating the profile of the user using the generated clusters and a place engine for processing a cluster associated with GPS data using the generated profile of the user (S1020).

More specifically, the profile engine may generate a cluster including the following information from the source data which may be obtained through the terminal of a user.

Message: major keyword information
Image/video: text information which may be extracted through an image tag/OCR model
App usage: App Name/Category information
Calendar: Title/place information
Task: Title information
Call log: address book name/telephone number information
Memo: major keyword information Furthermore, the profile engine may generate the profile of the user using the cluster. To this end, a machine learning model or a deep learning model using the clusters as an input value may be used, and an AI technology may be used.

The place engine may cluster GPS data which may be obtained through the terminal of a user, may merge the GPS data in a meaningful region unit using the profile of the user, and may generate the ROI of the user by labeling the region unit using the profile of the user.

The ROI data of the user may include the following information, for example.

Category: ROI classification (POI type, ROI type)
Label Name: data labeled based on the profile of a user
Last visit time: the last visit timing
Latitude: latitude
Longitude: longitude
Range: range
Visit count: total number of visits
Day count: total days of visits
Total stayed time: total time of stays The ROI provider 803 may provide the user with the generated ROI data of the user through the terminal of the user (S1030). The user may search for ROI data based on information labeled for each ROI data of the user, or the processor 110 may automatically provide the user with information on the ROI data through the intelligence service model.

Generation of Region of Interest (ROI)

Figure 10:
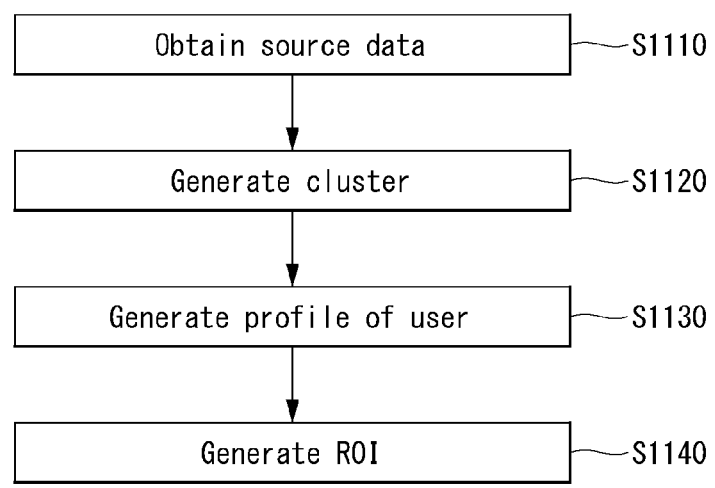
FIG. 10 is a flowchart of a method of generating an ROI according to various embodiments of the present disclosure.

FIG. 10 is a flowchart of a method of generating an ROI according to various embodiments of the present disclosure.

The collection engine 801 obtains source data for generating the profile of a user through the terminal of the user (S1110). The source data may mean big data which may be generated as a user uses a terminal.

The classification engine 802 generates a cluster composed of a set of data having a category related to the generation of the ROI data of the user in order to generate the profile of the user using the source data (S1120).

Furthermore, the classification engine 802 generates the profile of the user by analyzing the cluster (S1130). The profile of the user may mean personal information of the user related to a geographical area.

Furthermore, the classification engine 802 may set a geographical area interested by the user based on the profile of the user, and generates the ROI data of the user by performing a labeling task on the geographical area using the profile of the user (S1140).

Point of Interest (POI) Data

Figure 11:
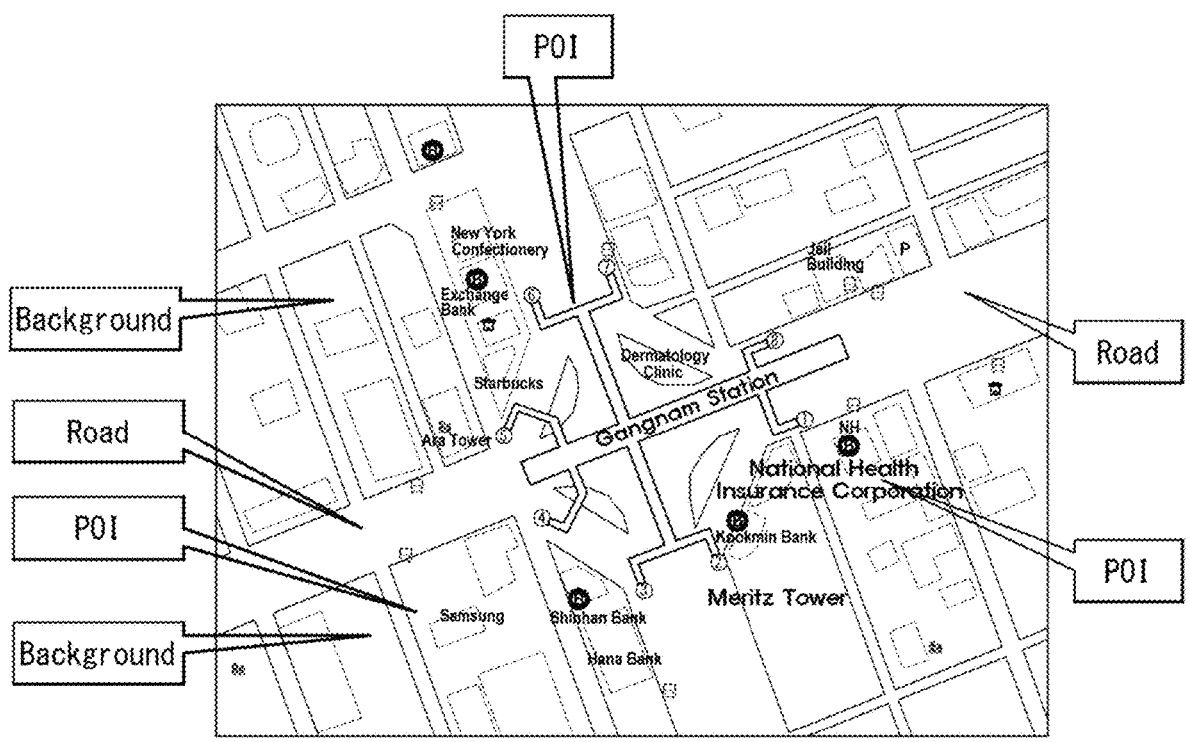
FIG. 11 is an example of an electronic map to which POI data is applied, which may be applied to various embodiments of the present disclosure.

FIG. 11 is an example of an electronic map to which POI data is applied, which may be applied to various embodiments of the present disclosure.

POI data means data that represents a major facility, a station, an airport, a terminal, a hotel, and a department indicated as coordinates in an electronic map along with geographical information. The electronic map may include three elements, such as a point, a line, and a polygon, for example. The three elements may be indicated as POI data, a road, and background in the electronic map.

Referring to FIG. 11, the POI data may indicate Gangnam Station, Meritz Tower, National Health Insurance Corporation, etc. The road indicates a road in common used for common traffic. The background indicates a polygon where a building, an area, or the high and low of a land is indicated. In the present disclosure, the processor 110 may use POI data, which may be obtained based on map information, in order to generate the ROI of a user.

FIG. 12 is an example of labeling data which may be applied to various embodiments of the present disclosure.

The intelligence service model may set the category field of ROI data of a user based on the type of event data for generating a cluster. For example, if the type of event data is an SMS/MMS, the category field may be set as a message ROI. Labeling data may be obtained by extracting a keyword based on the type of event data. For example, if the type of event data is an SMS/MMS, labeling data may be obtained by extracting text (e.g., payment details) within the SMS/MMS. In this case, if the text within the SMS/MMS is "∘∘ sushi restaurant", the labeling data of the ROI data of a user may be set as "∘∘ sushi restaurant."

Figure 13:
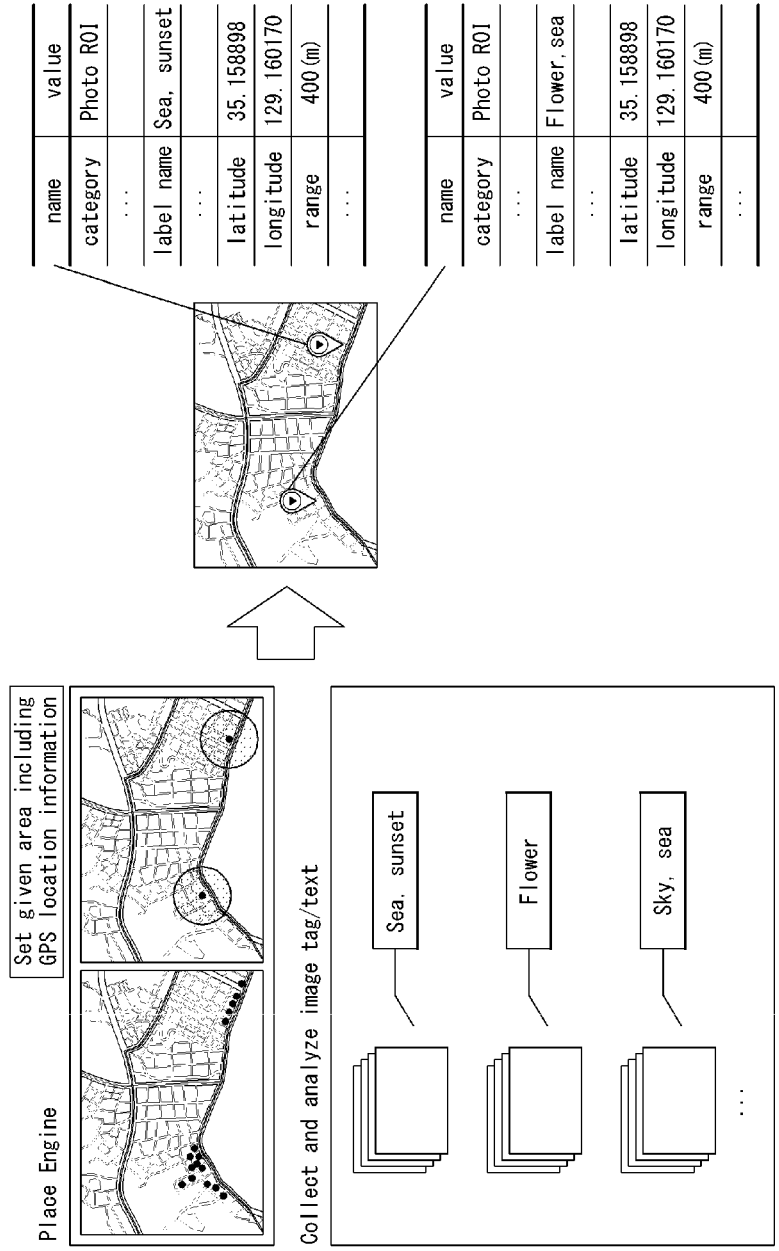
FIG. 13 is an example of labeling data which may be applied to various embodiments of the present disclosure.

FIG. 13 is an implementation example of the labeling data described with reference to FIG. 12.

When an event set in a user equipment (UE) occurs, the place engine may set a certain area including obtained location information. The aforementioned POI data may be used for the accuracy of the first location information or a certain area of the ROI data of the user may be set based on location information corresponding to the POI data. If the type of event data is an image, labeling data may be obtained from a tag included in the image data or text which may be extracted from the image. For example, if the tag included in the image is the sea, sunset, a category field included in ROI data of the user that indicates the region from which the image was obtained may be set as a photo ROI. A label name may be set as the sea, sunset.

The AI device 100 applied to various embodiments of the present disclosure may generate or update the profile of a user using an ROI generated by the method described with reference to FIGS. 8 to 13, and detailed contents thereof are described with reference to FIGS. 14 to 16 below.

Figure 14:
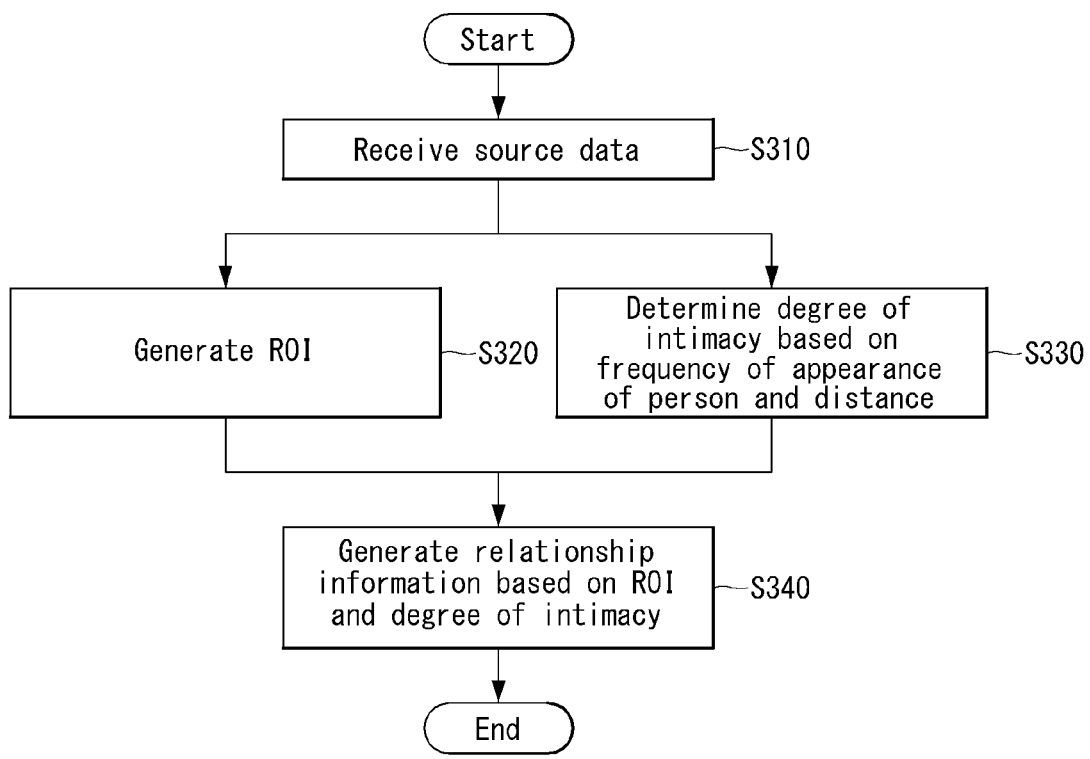
FIG. 14 is a flowchart of a profiling method according to an embodiment of the present disclosure.

FIG. 14 is a flowchart of a profiling method according to an embodiment of the present disclosure. Contents redundant with those of FIGS. 8 to 13 are omitted.

Referring to FIG. 14, the AI device 100 may receive source data through the communication module (S310). The source data may be stored and managed for each category which may be defined to generate the ROI of a user. The source data may be input by the input device of the AI device 100 and stored in the memory or may be received from an external terminal through the communication module and stored in the memory. The stored source data may be used to subsequently generate or extract ROI data. The source data may include a message (e.g., SMS, MMS), an image (or a still image or a moving image), an application usage, a calendar, a task, a call log, and a Q-memo, for example, but is not limited thereto.

The AI device 100 may generate ROI data based on the source data received through the processor 110 (S320). More specifically, the processor 110 may cluster the source data based on map data (e.g., GPS data) from which the source data is generated and collected, and may generate the ROI data indicative of a cluster based on information on the cluster generated as the results of the clustering. The clustering may be performed using an Euclidean distance or a Mahalanobis distance, but the present disclosure is not limited thereto. For example, the processor 110 may cluster two or more source data based on a visit time, a visit count or a category type for a specific area. As described above, the generated ROI may include information on the two or more source data, that is, a basis for the ROI.

For example, if the source data is an image, the processor 110 may generate ROI data using a tag for at least one object included in the image. If an ROI is a golf course, the processor 110 may extract tags for a mountain, a lake, a slope, grass, a ball, and sports included in an image, and may generate ROI data called the golf course based on the extracted tags.

For another example, if the source data is a calendar, the processor 110 may generate ROI data using the title, place or time of the calendar. If an ROI is a volunteer group, the processor 110 may collect an image related to a title (e.g., "LG Electronics New Year's Service Meeting"), place and time of a schedule included in a calendar, and may determine an ROI based on map information from which a plurality of images related to the place and time was generated. More specifically, if a volunteer group has been scheduled in Gangwon-do from 2 p.m to 7 p.m. in December 31 and previously stored in a calendar, a plurality of images generated at the preset time and place may be the target of clustering. In this case, a generated cluster may indicate the ROI of the volunteer group.

The AI device 100 may classify a relationship between persons based on the ROI data (S330). Specifically, the AI device 100 may classify a relationship between two or more persons through the processor 110. In this case, the AI device 100 may classify the relationship between the two or more persons based on the ROI data. For example, if an ROI is a golf course, the AI device 100 may classify a relationship between two or more persons, included in an image collected from the ROI, as a relation related to the golf course. For another example, if an ROI is a volunteer group, the AI device 100 may classify a relationship between two or more persons, included in an image collected from the ROI, as a relation related to a volunteer group. That is, the processor 110 may set, based on the ROI, the relationship between the two or more persons included in one image or two or more images collected from the ROI based on ROI data generated based on source data.

The AI device 100 may determine a degree of intimacy based on frequency of simultaneous appearance of persons and the distance between the persons (S340). Specifically, the AI device 100 may analyze one image or two or more images collected from the ROI through the processor 110, and may calculate frequency of simultaneous appearance of persons included in the one image or two or more images or calculate a distance between two or more persons included in the image. The processor 110 may set the calculated frequency of simultaneous appearance and the calculated distance as the input data of a neural network model, and may generate a value related to a degree of intimacy between the two or more persons based on the output of the neural network model. In this case, the processor 110 may set the relationship between the persons based on the value related to the degree of intimacy.

More specifically, the AI device 100 may detect a face of a person included in a plurality of images, and may generate an embedding vector indicative of the detected face. In an embodiment, the AI device 100 may digitize a distance between a user and a specific person based on the embedding vector, and may determine a degree of intimacy between the user and the specific person based on the numerical value. In another embodiment, the AI device 100 may determine the degree of intimacy between the user and the specific person based on frequency of simultaneous appearance of the specific person along with the user in a plurality of images in addition to the distance between the user and the specific person.

The AI device 100 may generate relationship information based on the ROI and the degree of intimacy (S340). Specifically, the AI device 100 may generate the relationship information based on the ROI and/or the value related to the degree of intimacy generated at steps S330 and S340 through the processor 110. The relationship information denotes profile information related to a specific person. The profile information may include at least one of the name, photo, job, telephone number, e-mail, and a group of a specific person or a relationship between the specific person and a user. Particularly, in various embodiments of the present disclosure, the relationship with the user may be generated based on an ROI and a degree of intimacy. The relationship with the user may be determined based on the ROI and/or the degree of intimacy generated at steps S330 and S340. For example, if the ROI is a golf course and a degree of intimacy between two persons included in an image belongs to a given criterion range, the processor 110 may set the two persons, included in the image, as a "golf course+friend" relationship. For another example, if the ROI is a volunteer group and a degree of intimacy between six persons included in an image belongs to a given criterion range, the processor 110 may set the six persons, included in the image, as a "volunteer group+member" relationship.

In the example of the volunteer group, the AI device 100 may set relationships between the six persons of a group and also set a relationship related to the six-person group itself. Specifically, a relationship for the six-person group may be set as a "volunteer group+members". Alternatively, with respect to each of the six persons (first person to sixth person), the first person may be set as a "volunteer group+friend", the second person may be set as a "volunteer group+member", and the third person may be set as a "volunteer group+boyfriend or girlfriend."

The relationship information generated as described above may be used to update the profile of a specific person or the profile of a user stored in the AI device 100. As described above, information of a specific person can be updated without manually being input because relationship information is generated and incorporated based on an ROI.

Figure 15:
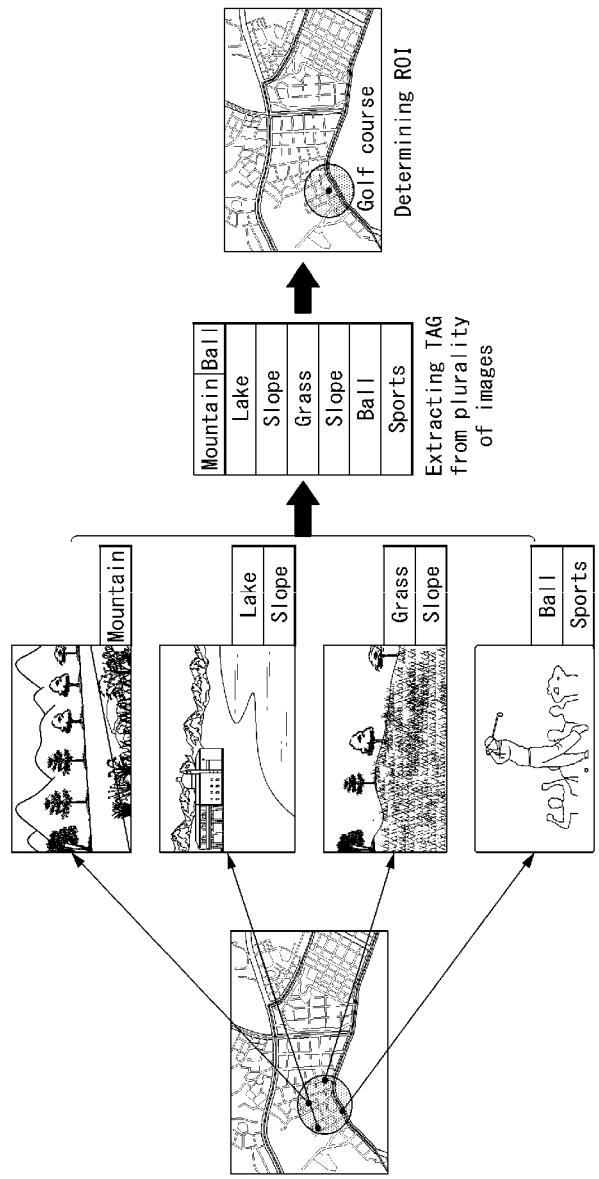
FIG. 15 and FIG. 16 are a first implementation example of a profiling method according to an embodiment of the present disclosure.
Figure 16:
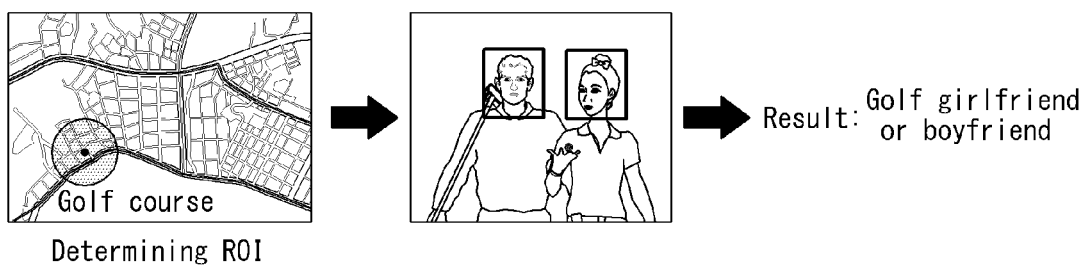

FIG. 15 and FIG. 16 illustrate a first implementation example of a profiling method according to an embodiment of the present disclosure.

Referring to FIG. 15 and FIG. 16, the AI device 100 may extract an ROI based on a tag of an image. Specifically, the AI device 100 may analyze tags of a plurality of images stored in the memory, and may generate a cluster based on the results of the analysis and map information of the plurality of images. Thereafter, the AI device 100 may extract an ROI indicative of the generated cluster. For example, the AI device 100 may extract two or more images stored at a geographical location among the plurality of images stored in the memory, and may analyze the tag of the extracted two or more images. If tags, such as "a mountain, a lake, a slope, grass, a ball, and sports", are extracted by analyzing the tags of the extracted two or more images, the AI device 100 may extract a geographical location as a golf course based on the extracted tags, and may generate an ROI named a golf course.

In this case, the AI device 100 may analyze a person included in a plurality of images stored or generated based on the ROI called the golf course. A higher degree of intimacy may be calculated as the number of images in which a first person, that is, a user, and a second person, that is, the other person, simultaneously appear is increased by analyzing the plurality of images stored or generated in the golf course. Furthermore, faces of the first person and the second person may be detected, and a higher degree of intimacy may be calculated as a distance between the faces is calculated more closely as a result of the detection. For example, in FIG. 16, relationship information between two persons determined based on the generated in the ROI may be set as a "golf course boyfriend or girlfriend."

Figure 17:
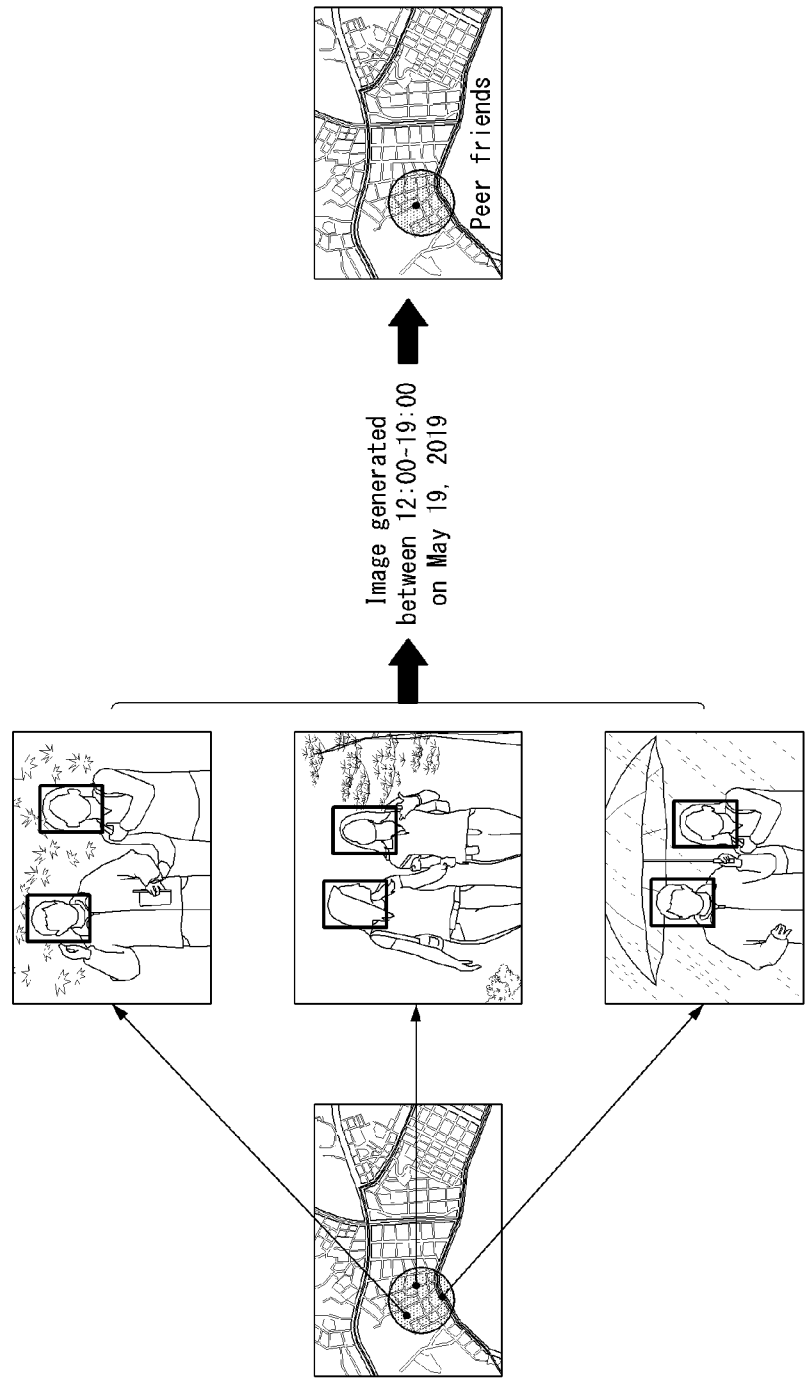
FIG. 17 and FIG. 18 illustrate a second implementation example of a profiling method according to an embodiment of the present disclosure.
Figure 18:
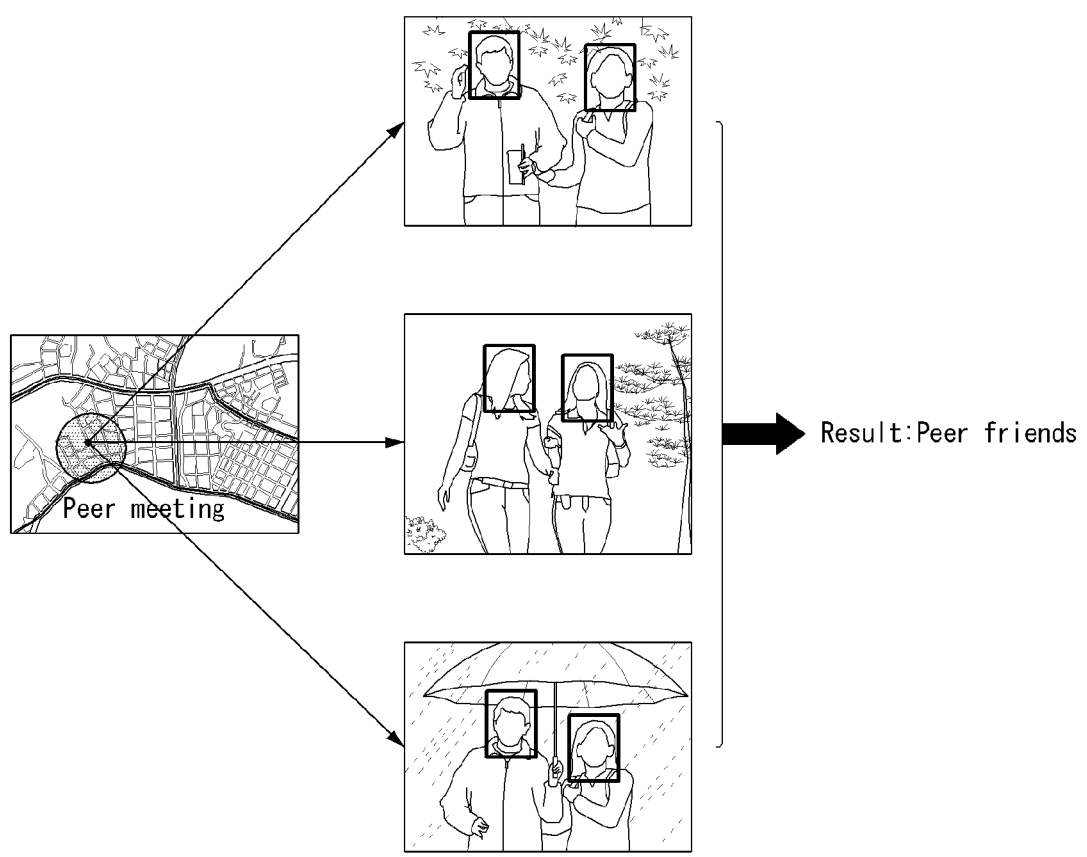

FIG. 17 and FIG. 18 illustrate a second implementation example of a profiling method according to an embodiment of the present disclosure.

Referring to FIG. 17 and FIG. 18, the AI device 100 may extract an ROI based on calendar information. Specifically, the AI device 100 may analyze calendar information stored in the memory, and may generate a cluster based on map information of a plurality of images related to the calendar information. Thereafter, the AI device 100 may extract an ROI indicative of the generated cluster. For example, the AI device 100 may extract a POI Name called "reunion", location information "∘∘ wedding hall", and time information "12:00~19:00 May 19, 2019" in the calendar information stored in the memory. The AI device 100 may extract a plurality of images stored or generated at a location and/or time corresponding to the calendar information, and may perform clustering on the plurality of images. If a meaningful ROI is determined based on the result of the clustering, the AI device 100 may store a determined cluster in the memory. In this case, in the example of FIG. 16, the AI device 100 may extract an ROI called "reunion" based on calendar information.

In this case, the AI device 100 may analyze a person included in the plurality of stored or generated images in the ROI called "reunion." A higher degree of intimacy may be calculated as the number of images in which a first person, that is, a user, and a second person, that is, the other person, simultaneously appear is increased by analyzing the plurality of images stored or generated in the volunteer group. Furthermore, faces of the first person and the second person may be detected, and a higher degree of intimacy may be calculated as a distance between the faces is calculated more closely as a result of the detection. For example, in the example of FIG. 18, a relationship between the plurality of persons included in the image generated based on the ROI may be defined as a "peer friends." All of a plurality of persons does not need to be set as the same relationship information, and may be set as different relationship information depending on each of the persons.

Figure 19:
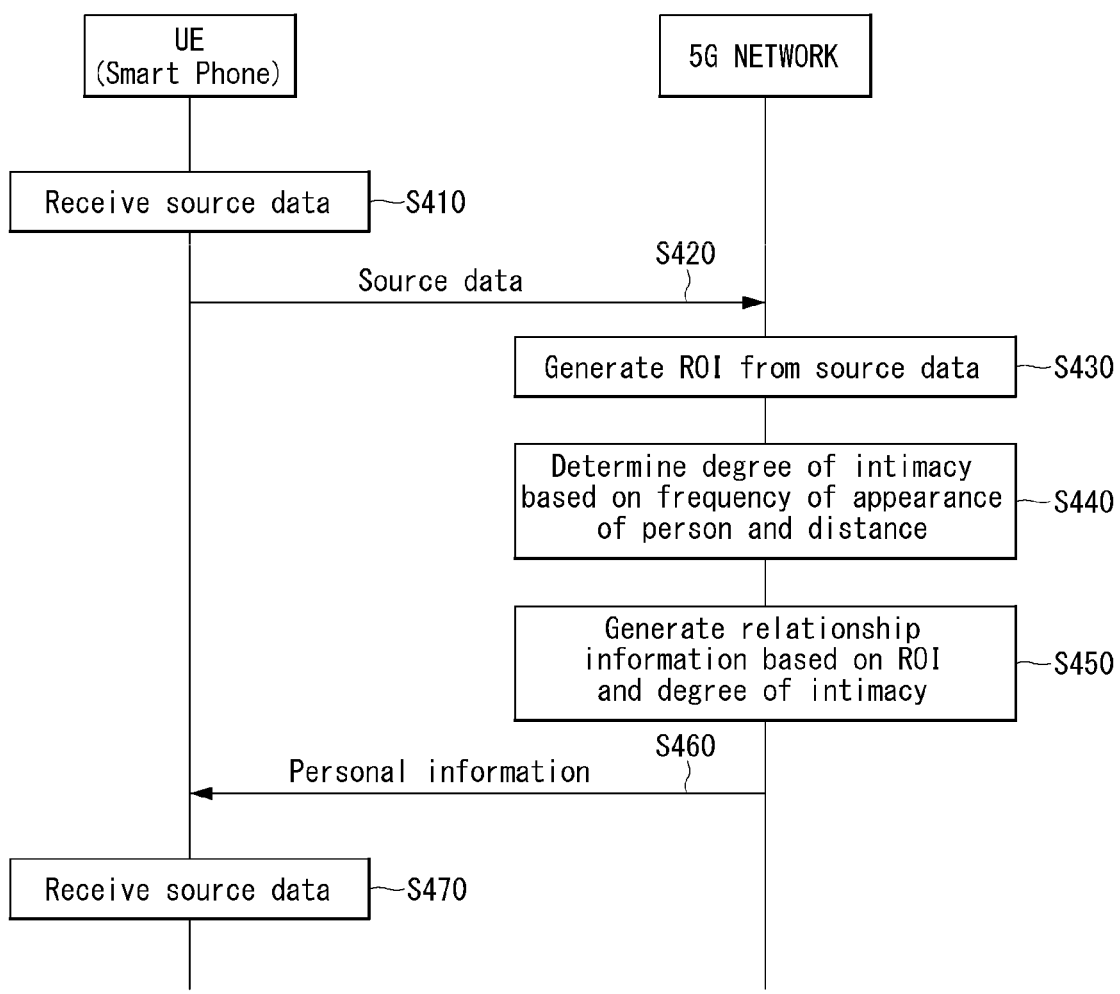
FIG. 19 is a sequence diagram of a profiling method according to another embodiment of the present disclosure.

FIG. 19 is a sequence diagram of a profiling method according to another embodiment of the present disclosure.

Referring to FIG. 19, a user equipment (UE) may control the transceiver to transmit source data or a feature, extracted from the source data, to the AI system 1 included in a 5G network. Furthermore, the UE may control the transceiver to receive AI-processed information from the AI system 1.

The UE may perform an initial access procedure with the 5G network in order to transmit the source data to the 5G network. The UE may perform the initial access procedure with the 5G network based on an SSB.

Furthermore, the UE may receive, from the network, DCI used to schedule the transmission of the source data through the transceiver.

The UE may transmit, to the 5G network, the source data or a feature value extracted from the source data based on the DCI.

The source data or the feature value extracted from the source data is transmitted to the 5G network through a PUSCH. The DM-RSs of the SSB and the PUSCH may be QCLed with respect to a QCL type D.

Referring back to FIG. 19, the UE may generate source data or may receive the source data from an external terminal (S410). The UE may transmit the source data to the 5G network (S420). The AI system 1 may generate ROI data from the source data (S430). The AI system 1 may determine a degree of intimacy based on frequency of simultaneous appearance of a specific person and a user and a distance between the specific person and the user, calculated in a plurality of images obtained in an ROI (S440). The AI system 1 may generate relationship information indicative of a relationship between the user and the specific person based on the ROI and the degree of intimacy (S450). The 5G network may transmit the relationship information to the UE (S460). The UE may store the relationship information in the memory (S470). S410, S430, S440, and S450 in the profiling method of FIG. 19 correspond to S310, S320, S330, and S340 in the profiling method of FIG. 14, respectively.

Figure 20:
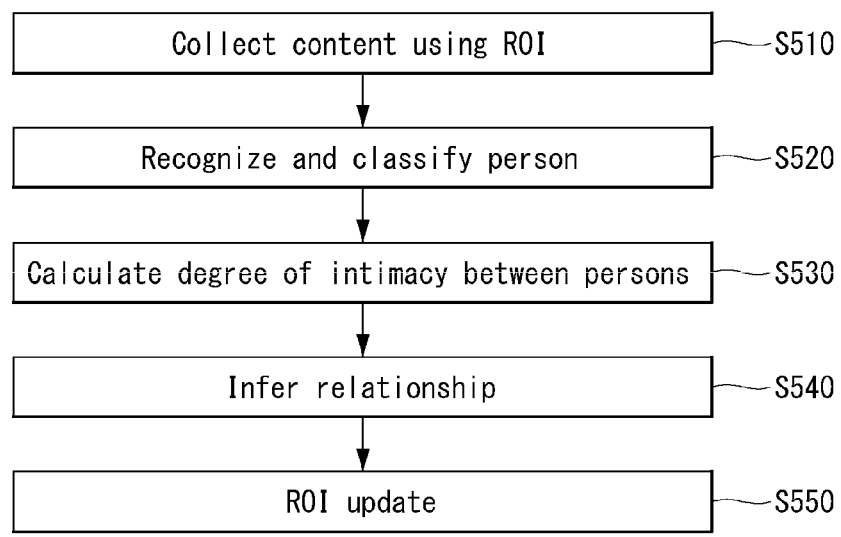
FIG. 20 is a flowchart of a profiling method according to another embodiment of the present disclosure.

FIG. 20 is a flowchart of a profiling method according to another embodiment of the present disclosure.

Referring to FIG. 20, the AI device 100 may collect location-based content (S510). For example, the AI device 100 may collect location-based content based on ROI information including information on a geographical area, which is determined to be interested by a user. Specifically, assuming that first ROI information to N-th ROI information are present, the AI device 100 may analyze content stored in the memory or a cloud, and may receive or collect content corresponding to the first to N-th ROI information. The content collected as described above may be used for a profiling method using an ROI. Content not including ROI information may be excluded from profiling according to an embodiment of FIG. 20 or may be transmitted to an ROI generation algorithm in order to generate ROI information. The location-based content is defined as various types of content including location information. The location-based content may include an image, an SMS/MMS message, and a calendar, but is not limited thereto.

The AI device 100 may detect each of a plurality of persons and classify each of the plurality of persons (S520). The AI device 100 may detect a face of the person. The AI device 100 may assign different ID information (e.g., ID) to a face of each person and store the ID in the memory. The AI device 100 may identify or classify a plurality of persons included in content by comparing ID information stored in the memory and ID information inferred from a face of the person. If a person is a person not previously stored in the memory, the AI device 100 may assign new ID information to the person and store the new ID information in the memory.

The AI device 100 may generate information on a degree of intimacy of each of the plurality of persons (S530). The information on the degree of intimacy may individually include the degree of intimacy of each of the plurality of persons. For example, if first to third persons are included in content, a degree of intimacy of each of the plurality of persons may include a degree of intimacy between the first person and the second person, a degree of intimacy between the second person and the third person, and a degree of intimacy between the first person and the third person. The degree of intimacy may be determined based on at least one of a distance between the plurality of persons included in location-based content or the number of times that the persons simultaneously appear. In particular, the degree of intimacy may be inferred using a neural network model configured with a plurality of nodes. The neural network model may be a neural network model trained by setting, as an input, values related to the number of times that a person appears within one piece of content and a distance between the persons. The distance between the persons may include a distance between faces of the persons, a distance between the shoulders of the persons, and a slope of the body of the person in the direction in which the person faces the front, but the present disclosure is not limited thereto.

The AI device 100 may generate information on a personal relationship between the plurality of persons based on the information on the degree of intimacy and/or location information of the content (S540). The location information includes ROI information. Furthermore, the information on the personal relationship may include a friend relationship, a boyfriend or girlfriend relationship, and a peer relationship, but is not limited thereto. Furthermore, the information on the personal relationship may be implemented as a golf course friend relationship, a golf course boyfriend or girlfriend relationship, or a golf course peer relationship based on location information, but is not limited thereto.

The AI device 100 may update the ROI information based on the information on the personal relationship so that the ROI information is associated with the information on the personal relationship (S550). For example, the ROI information may be updated with the golf course friend, the golf course boyfriend or girlfriend or the golf course reunion illustrated in step S540, but the present disclosure is not limited thereto.

As described above, the profiling method according to various embodiments of the present disclosure may be subsequently used for the management of content and/or scheduled of a user. For example, a plurality of images stored in the memory based on a relationship between a user and another person may be grouped based on a degree of intimacy. Information on a personal relationship may be labeled in at least one group. The at least one group generated as described above may subsequently provide improved accessibility in checking the content of the user.

Furthermore, the profiling method according to various embodiments of the present disclosure may be used to search for a person associated with a user and/or content including the associated person based on ROI information updated according to the profiling method. For example, the AI device 100 may search for a plurality of pieces of content or user profiles, stored in the memory, based on ROI information based on a relationship between persons in response to a user input. For example, when search for "Seocho-gu reunion" is input, the AI device 100 may search for at least one piece of content related to the Seocho-gu reunion.

Furthermore, the profiling method according to various embodiments of the present disclosure may provide a degree of intimacy and/or relationship for a new person not including information on a degree of intimacy and/or a personal relationship. For example, when a new person is detected, the AI device 100 may assign personal relationship information on the new person based on at least one of a distance between the new person and an already stored person, frequency of simultaneous appearance, or ROI information. For example, if a plurality of persons is included in one image in a wedding hall, the AI device 100 may derive a relationship between a plurality of images by dividing the plurality of persons into the bride and groom sides.

Effects of the profiling method and apparatus based on a personal region of interest according to embodiments of the present disclosure are described as follows.

The present disclosure can generate information on a plurality of persons based on a degree of intimacy between the persons.

Furthermore, the present disclosure can generate the relationship information between persons by considering an ROI.

Effects which may be obtained in the present disclosure are not limited to the aforementioned effects, and other technical effects not described above may be evidently understood by a person having ordinary skill in the art to which the present disclosure pertains from the above description.

The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A profiling method comprising:
    obtaining, by a processor, source data for generating a profile;
    performing, by the processor, clustering based on the source data and map information related to the source data;
    generating, by the processor, a profile of a person using a cluster generated through the clustering, wherein the profile of the person includes personal information of the person related to a geographical area;
    generating, by the processor, region of interest (ROI) data indicative of an interest region of a user based on the profile of the person and collecting a plurality of images obtained from the ROI data; and
    determining, by the processor, a degree of intimacy between the user and a specific person included in the plurality of images by analyzing the plurality of images and generating relationship information indicative of a relationship between the specific person and the user based on the degree of intimacy and the ROI data,
    wherein the generating the ROI data indicative of an interest region of a user based on the profile of the person and collecting the plurality of images obtained from the ROI data includes:
        setting, by the processor, a geographical area interested by the user based on the profile of the person; and
        generating, by the processor, the ROI data of the user by performing a labeling task on the geographical area using the profile of the person,
    wherein the degree of intimacy is determined by a pre-trained first neural network model, and
    wherein the first model is a neural network model pre-trained by setting, as an input, at least one of (i) a distance between the specific person and the user and (ii) a number of images in which the specific person and the user simultaneously appear and setting the degree of intimacy as an output.

2. The profiling method of claim 1, wherein the source data includes location information, message information, an image/video or calendar information of the user, information on a task input by the user, or a call log, memo or application usage of the user.

3. The profiling method of claim 1, wherein the source data is received from an external terminal.

4. The profiling method of claim 1, wherein the plurality of images includes an image including both the user and the specific person.

5. The profiling method of claim 1, wherein the degree of intimacy is increased as the distance between the specific person and the user is closer.

6. The profiling method of claim 1, wherein the degree of intimacy is increased as the number of images in which the specific person and the user simultaneously appear is increased.

7. The profiling method of claim 1, further comprising detecting faces of the specific person and the user in the plurality of images,
wherein the distance is a distance between a first face of the specific person and a second face of the user.

8. The profiling method of claim 1, further comprising:
receiving, from a network, downlink control information (DCI) used to schedule a transmission of the source data; and
transmitting the source data to the network based on the DCI.

9. The profiling method of claim 8, further comprising:
performing an initial access procedure with the network based on an synchronization signal block (SSB); and
transmitting the source data to the network through a physical uplink shared channel (PUSCH),
wherein demodulation reference signals (DM-RSs) of the SSB and the PUSCH are quasi-co-located (QCLed) with respect to a quasi-co-location (QCL) type D.

10. The profiling method of claim 9, further comprising:
controlling a transceiver to transmit the source data to an artificial intelligence (AI) processor included in the network; and
controlling the transceiver to receive AI-processed information from the AI processor,
wherein the AI-processed information includes the degree of intimacy and relationship information indicative of a relationship between the specific person and the user based on the ROI data.

11. A profiling method comprising:
collecting, by at least one processor, location-based content;
generating, by the processor, information on a degree of intimacy between at least two people among a plurality of persons based on both of a distance between the at least two people included in the location-based content and a number of times that the two people simultaneously appear; and
generating, by the processor, information on a character relationship between the at least two people based on the degree of intimacy and location information of the location-based content,
wherein the location information of the location-based content is Region of interest (ROI) data including information on a geographical area to be interested by a user,
wherein the ROI data is generated, by the processor, by performing a labeling task on the geographical area using a profile of a person,
wherein the degree of intimacy is determined by a pre-trained first neural network model, and
wherein the first model is a neural network model pre-trained by setting, as an input, at least one of (i) a distance between a specific person and the user and (ii) a number of images in which the specific person and the user simultaneously appear and setting the degree of intimacy as an output.

12. The profiling method of claim 11, further comprising updating the ROI data so that the ROI data is associated with the information on the character relationship.

13. The profiling method of claim 11, further comprising classifying at least one content based on ROI data associated with the location-based content.

14. The profiling method of claim 11, wherein the distance between the at least two people is a distance between faces of the at least two people plurality of persons detected from among the plurality of persons.

* * * * *